United States Patent [19]

Mollere

[11] 4,260,211

[45] Apr. 7, 1981

[54] QUICK COUPLER FOR SEISMIC STREAMER SECTIONS

[75] Inventor: John C. Mollere, Nassau Bay, Tex.

[73] Assignee: Western Geophysical Co. of America, Houston, Tex.

[21] Appl. No.: 69,208

[22] Filed: Aug. 23, 1979

[51] Int. Cl.³ ............................................. H01R 13/62
[52] U.S. Cl. ................................. 339/91 B; 285/315; 339/64 M; 339/117 R
[58] Field of Search ................ 339/91 B, 49 R, 49 B, 339/47 R, 115 R, 117 R, 117 P, 64 R, 64 M; 285/316, 315, 277; 367/20, 15, 177

[56] References Cited

U.S. PATENT DOCUMENTS

| | | | |
|---|---|---|---|
| 2,465,696 | 3/1949 | Paslay | 367/20 X |
| 2,470,256 | 5/1949 | McIlroy | 285/277 |
| 3,290,645 | 12/1966 | Pavey et al. | 367/24 |
| 3,376,948 | 4/1968 | Morrow | 367/18 X |
| 3,812,455 | 5/1974 | Pearson | 339/49 R X |
| 3,817,560 | 6/1974 | Guertin | 285/277 X |
| 3,964,771 | 6/1976 | Bandoin | 339/91 B X |
| 4,092,629 | 5/1978 | Siems et al. | 367/15 X |
| 4,166,663 | 9/1979 | Walker et al. | 339/49 B |

Primary Examiner—Eugene F. Desmond
Attorney, Agent, or Firm—William A. Knox

[57] ABSTRACT

A coupler for connecting two seismic streamer sections together consists of a two-part hollow quick-disconnect fitting. The fitting has an internal diameter sufficient to contain a multicontact connector strip for electrically interconnecting the signal wires from the two streamer sections. When assembled the two parts of the housing are non-rotatable with respect to each other.

2 Claims, 10 Drawing Figures

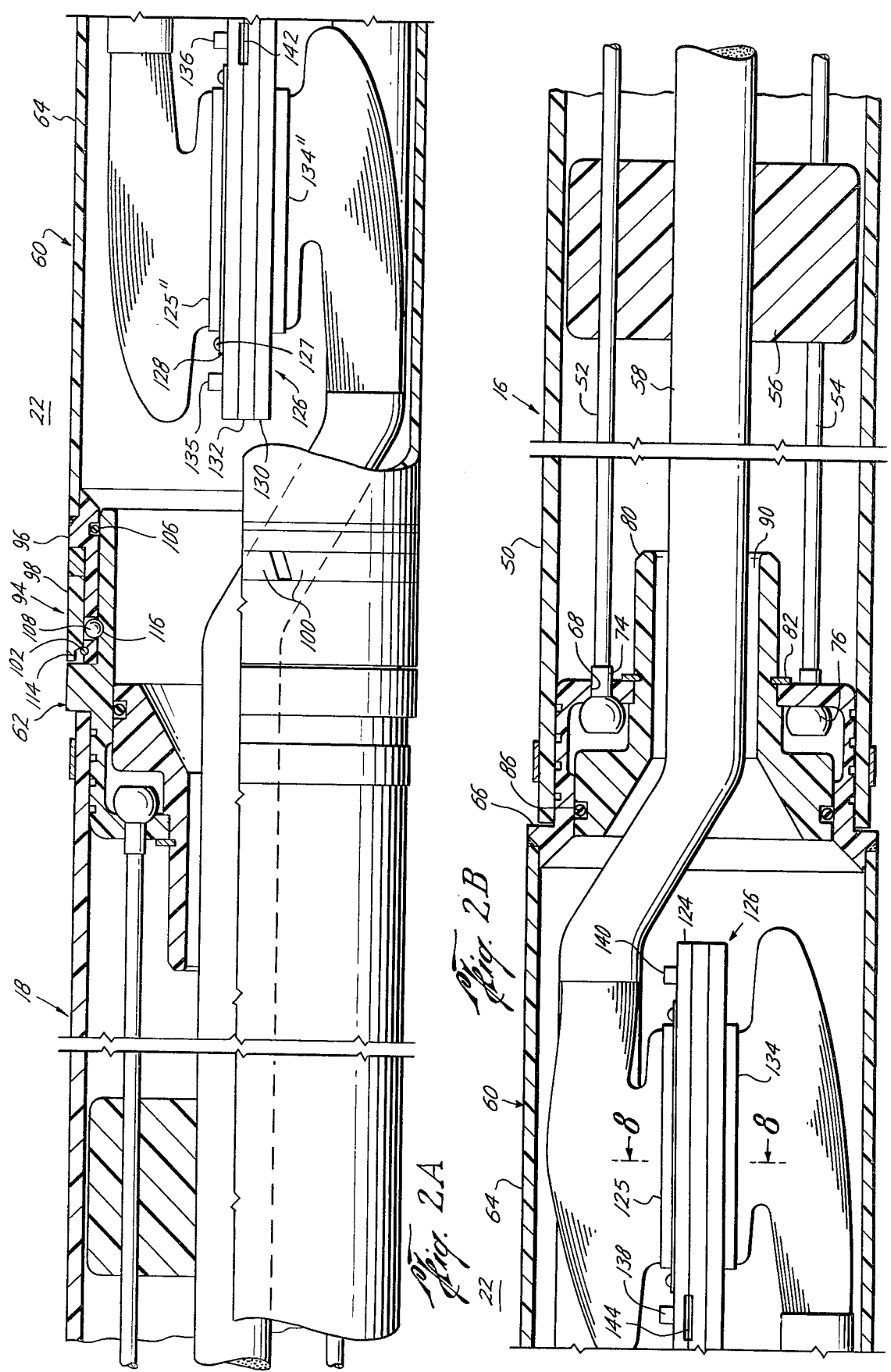

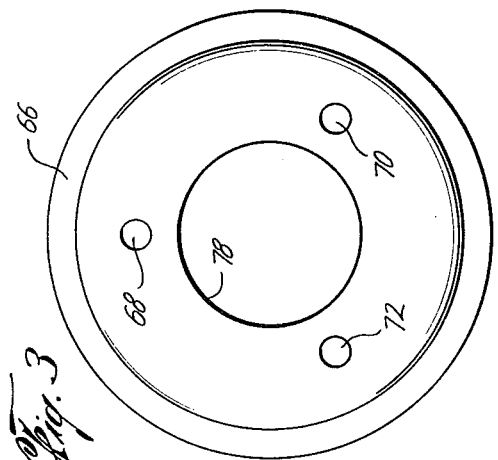
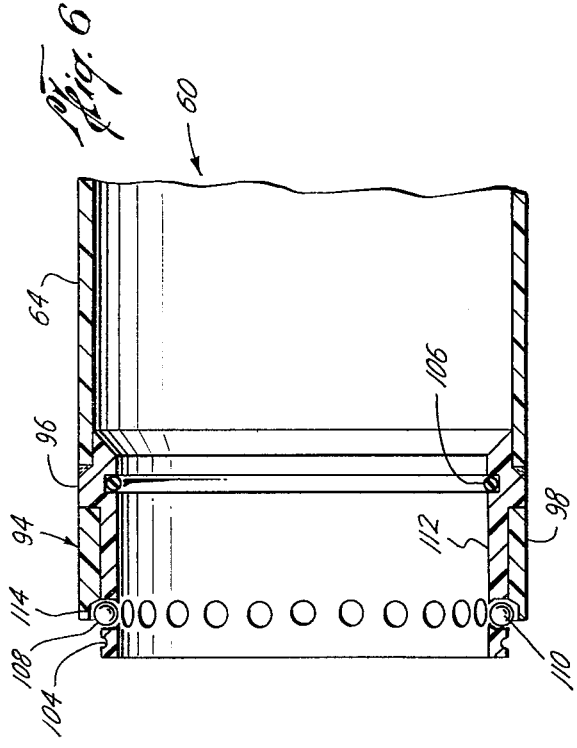
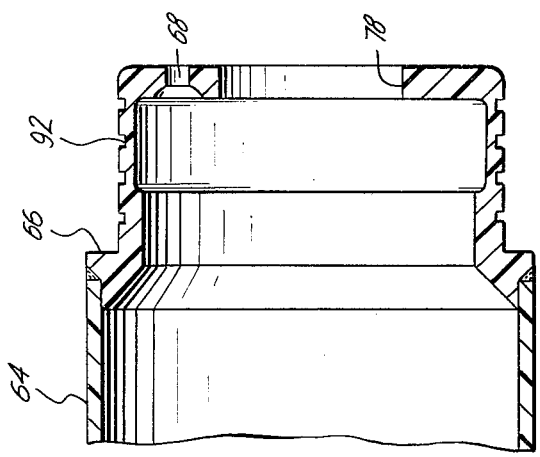
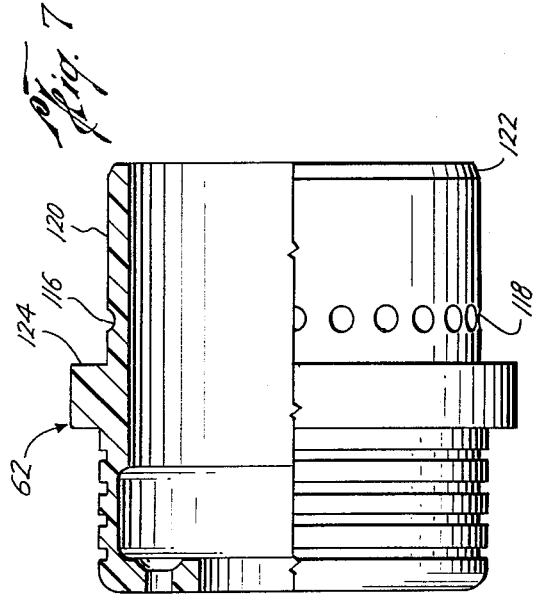
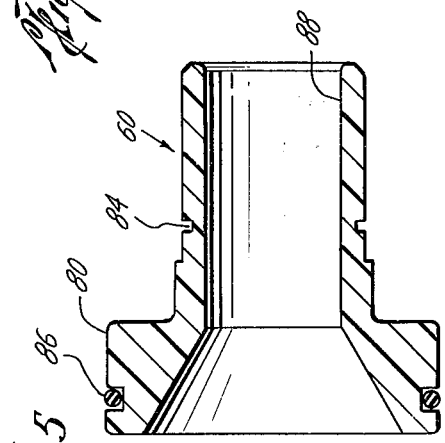

QUICK COUPLER FOR SEISMIC STREAMER SECTIONS

BACKGROUND OF THE INVENTION

1. Field of the Invention

This invention lies within the field of seismic streamer cables for marine use and in particular relates to a means for interconnecting a plurality of sections to form a complete streamer cable.

2. Description of the Prior Art

In marine seismic surveys, a ship tows a neutrally buoyant streamer cable through the water along a line of survey. The complete streamer is composed of a plurality of separate active sections that are interconnected by suitable coupler sections. Typically each active section may be 200 to 300 feet long. Fifty or more such sections may be employed to make up the complete streamer which may be more than two miles long. When not deployed for use, the streamer cable is wound on a huge cable reel mounted on the stern of the ship.

Typically, each section consists of a hose-like cylindrical jacket of plastic such as polyvinyl chloride about 2.5 to 3.0 inches in outside diameter. A plurality of plastic spacers are disposed inside the jacket at desired intervals along the length of the section. Two or more steel stress members are threaded through holes around the periphery of the spacers to absorb the towing tension. A plurality of hydrophones are mounted inside the jacket at suitable locations between the spacers. A plurality of conductor pairs, for transmitting signals from the hydrophones to a recording device aboard the ship, are laced into a wire bundle that is threaded through central holes in the spacers. There may be 225 or more conductor pairs.

Each end of the section is sealed by a terminal bulkhead. The terminal bulkhead fits snugly inside the ends of the jacket. The jacket is then fastened tightly to the terminal bulkhead by metal bands to form a water-tight seal. After assembly, the cable section is filled with a low-specific-gravity kerosene through an oil-fill valve in the terminal bulkhead to render the section neutrally buoyant. The stress members protrude through the terminal bulkheads at each end of the section, extending one or two feet beyond the section ends. The stress members are terminated by aircraft-type clevises. The conductor pairs also extend through and beyond the terminal bulkhead. The conductor pairs are soldered to the terminals of miniature flat pin-and-socket connector plugs. Each plug may include about 25 contact pairs so that nine such plugs are needed for a 225-pair wire bundle. The plugs are staggered longitudinally with respect to each other over a distance of one to three feet beyond the ends of the section so that no two connector plugs abut one another. The holes through which the stress members and the wire bundle penetrate the terminal bulkheads are sealed so as to be watertight.

The structure of typical streamer cables are described in U.S. Pat. No. 2,465,696 to Paslay, U.S. Pat. No. 3,290,645 to Pavey, Jr. et al and U.S. Pat. No. 4,092,629 to Siems et al.

Various ways have been devised to connect two adjacent cable sections together. Commonly the mating stress-member clevises, from the two sections to be connected, are coupled together by suitable pins which are locked in place by cotter pins. The respective mating connector plugs are joined and locked in place. The combined lengths of the coupled protruding stress members associated with the two cable sections are adjusted so that the wire bundles are slack when the stress members are under tension. Upon completion of the mechanical and electrical connections a short protective boot, consisting of a length of plastic hose, is slipped over the exposed connector plugs and stress members. The boot, usually two to six feet long, is filled with kerosene for buoyancy and electrical insulation purposes. The boot is secured to the terminal bulkheads of the adjacent cable sections by metal bands thereby protecting the electrical connector plugs and stress members from water invasion. See particularly U.S. Pat. No. 3,376,948 to Morrow, FIGS. 1, 1a for an illustration of conventional couplers.

Despite its seeming simplicity, the coupler section above described is unsatisfactory for a number of reasons. The metal housings of the connector plugs, being necessarily in intimate contact with portions of the wire bundles, chafe the insulation of the conductors when the streamer cable is wound on or off the storage reel. Chafing causes short circuits and sometimes wire breakage. It is often necessary to disassemble the coupler sections in the field for repair. Disassembly is time-consuming and tedious because the metal bands must first be cut away, the kerosene poured out and the boot removed. Thereafter, the stress members must be disconnected. Reassembly is equally tedious. Additionally, since the coupler section is filled with kerosene, when the coupler section is disassembled the wires and plugs are oil-saturated, creating a messy work area and a potential fire hazard. Furthermore, a coupler section for use with streamer cables having 200–300 conductor pairs may be up to six feet long so that the connector plugs can be properly spaced apart. For a 50-section cable, the coupler sections add up to an extra 300 feet of cable that must be stored on the cable reel which has an inherently limited capacity.

There is a need therefore for a clean, more convenient, shorter coupler section that can be easily and quickly disassembled and reassembled in the field.

SUMMARY OF THE INVENTION

It is an object of this invention to provide a water-tight, quick-disconnect, cable-section coupler, hereinafter referred to simply as "coupler".

In a preferred embodiment, the coupler consists of a pair of hollow cylindrical male and female parts, each closed at one end. The male part is attached to one of two cable sections to be coupled together and the female part is secured to the other of the two cable sections. Both male and female parts have means at the closed ends for anchoring thereto the stress members of the respective cable sections. Each part is also provided with a sealing grommet at the closed end to allow fluid-tight entry of the signal conductor-pairs from the respective cable sections. The inner diameter of the two parts of the coupler is sufficient to receive a pair of mateable flat, elongated, multicontact connector plates as well as an optional cable-control electronics package. One of the connector plates is associated with each of the corresponding parts of the coupler. The signal conductor pairs entering each of the coupler parts are soldered to the contacts of the corresponding plate. The two connector plates are connected together and are contained within the assembled coupler.

A plurality of semispherical detents are milled around the outer circumference near the open end of the male coupler part. A like plurality of balls are disposed in ball-retainer orifices drilled around the outer circumference near the open end of the female part. The diameter of the ball retainer orifices is sufficient to allow the balls to protrude beyond the inner wall of the female part so that the balls will engage the detents when the male and female parts are assembled. An axially-slidable lock ring around the outer wall of the female coupler part may be moved to cover and lock the balls of the female part into the detents of the male part after the two parts are assembled. A keeper holds the lock ring in place after assembly.

In an aspect of this invention, means are provided for banding the plastic skin of each cable section to its corresponding attached coupler.

In another aspect of this invention an O-ring seal mounted on the inner wall of the female part of the coupler forms a fluid-tight seal with the male part when the two parts are engaged.

In yet another aspect of this invention, after assembly of the two coupler parts, the slip ring locks the balls in place in the detents to inhibit the male and female parts from relative rotation and from longitudinal separation when under tension.

BRIEF DESCRIPTION OF THE DRAWINGS

A better understanding of the advantages and benefits of this invention may be had by reference to the detailed description and the drawings wherein:

FIGS. 2A and 2B form an assembly drawing of the coupler section;

FIG. 3 is an end view of the forward bulkhead of the coupler section;

FIG. 4 is a cross-sectional view of the forward bulkhead;

FIG. 5 is a cross-sectional view of an oil block fitting;

FIG. 6 is a cross-sectional view of a ball retaining ring;

FIG. 7 is a cross-sectional view of the male part of the coupler section; and

DETAILED DESCRIPTION OF THE PREFERRED EMBODIMENT

Figure 1:
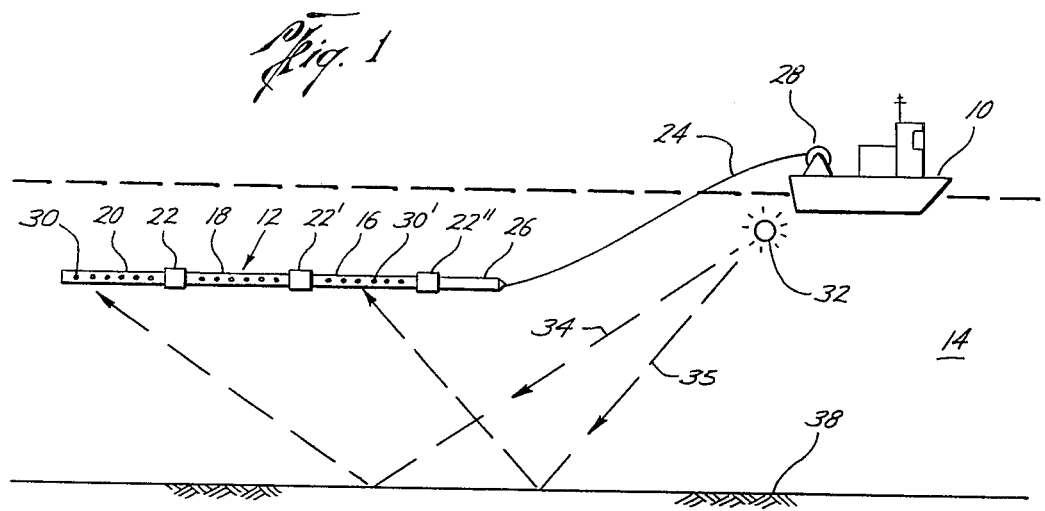
FIG. 1 is a schematic view of a marine streamer cable composed of a plurality of cable sections joined by the coupler sections of this invention.
Figure 8:
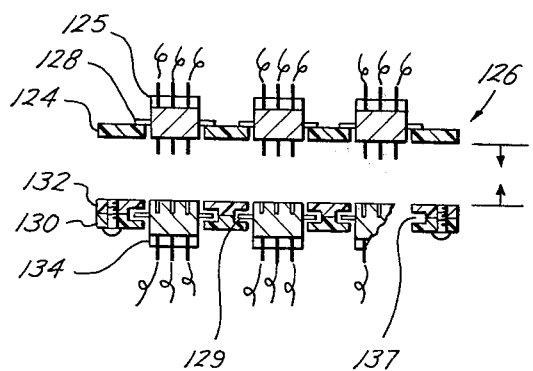
FIG. 8 is a cross-sectional view of the connector plate.
Figure 8A:
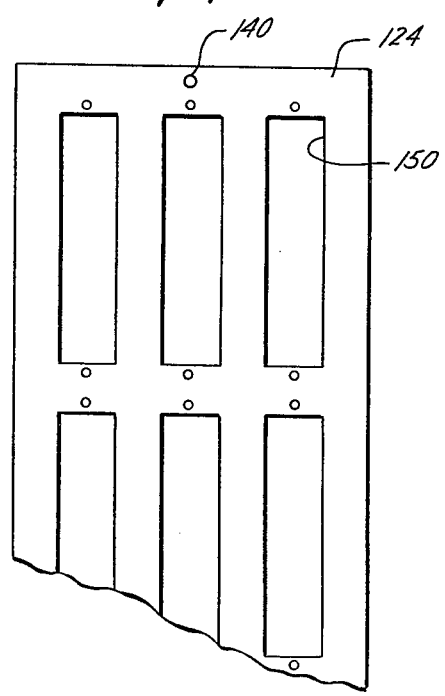
FIG. 8A is a partial plan view of FIG. 8.

Referring now to FIG. 1, in marine seismic exploration, a ship 10 tows a streamer cable 12 through a body of water 14. The streamer cable is composed of individual cable sections 16, 18, 20 which are connected together by coupler sections 22, 22', 22''. Each cable section may be 200–300 feet long whereas the coupler section is relatively short, on the order of 1 to 1.5 feet. The streamer cable is towed by tow line 24 through an acoustic isolator 26. When not in use, the streamer cable is reeled up and stored on cable reel 28. A plurality of hydrophones such as 30, 30', are contained within the cable sections which are then filled with oil to render the cable section neutrally bouyant. The hydrophones are connected to electrical conductors (not shown in FIG. 1) which transmit hydrophone signals through the cable sections, the coupler sections, the acoustic isolator and the tow cable, to suitable data recording instruments (not shown) in ship 10. There may be 225 or more hydrophones distributed along the streamer cable so that as many as 450 separate conductors are required.

In use, an acoustic pulse 32 is generated. The acoustic energy travels downwardly along ray paths 34, 35 to a submarine interface 38 whence it is reflected and is detected by hydrophones 30, 30'. As stated before, the detected acoustic signals are then transmitted back to ship 10 for recordation.

Referring now to FIGS. 2A and 2B there is shown partly in section a coupler section 22 joining two streamer cable sections such as 16 and 18, 16, FIG. 2B, being the leading section and 18, FIG. 2A, being the trailing section. Since both cable sections are structurally identical, the component parts of interest will be described only for cable section 16. The section includes a plastic jacket 50, a plurality of steel stress members 52, 54 and a plurality of spacers such as 56. Usually there are three stress members, of which two are shown in FIG. 2A. The conductors for transmitting hydrophone signals are tied in a wire bundle 58 which passes through a central hole in the respective spacers. After the cable section has been assembled, the jacket is filled with a light weight kerosene to render the section neutrally bouyant. Hydrophones (not shown) are arranged at intervals, between the spacers, along the cable section, the hydrophones being connected to appropriate conductor-pairs in the wire bundle.

The coupler section consists of two parts, a leading female part 60 that is secured to the trailing end of a leading cable section such as 16 and a trailing male part 62 that is secured to the leading end of a trailing section such as 18. Both parts are closed at one end as described hereinbelow. Note that the female part 60, is split between FIGS. 2A and 2B.

Female part 60 consists of a hollow stainless-steel housing 64 to the leading end of which is welded a stainless-steel, sealable, forward bulkhead 66 closed at one end. Referring to FIGS. 2B, 3, 4, bulkhead 66 has three holes 68, 70, 72 into which the stress members 52, 54 (and a third member not shown) may be anchored by means of ball anchors 74, 76 that are crimped to the stress members. A central aperture 78 receives an oil block assembly 80 (FIGS. 2B and 5) which may be of plastic such as LEXAN. Oil block 80 is inserted into aperture 78 and is held in place by a beryllium or copper retaining snap-ring 82, that fits into a circumferential slot 84. When oil block 80 is in place, O-ring 86 prevents oil from cable section 16 from seeping into housing 64. Oil block 80 has an opening 88 to admit wire bundle 58. After wire bundle 58 is in place, the volume between the wire bundle and the internal wall of opening 88 is filled with an epoxy potting compound 90 such as 3M SCOTCHCAST #4, sealing the closed end of female part 60 to prevent oil invasion. After assembly, jacket 50 of cable section 16 is slipped over the serrated end 92 of bulkhead 66 and is held in place by a steel band such as a PUNCH-LOK band.

Referring now to FIGS. 2A and 6, a ball retainer assembly 94 is welded to the trailing end of housing 64. The assembly consists of a ball retainer ring 96, ball locking ring 98, split-ring keeper 100 and a split-ring stop 102 that fits into peripheral slot 104 of ball retainer 96. An O-ring 106, to be discussed later, is mounted in a circumferential slot interiorly of ball retainer ring 96. Around the perimeter of ball retainer ring 96, near the open end thereof, are milled a plurality of hemispherically-shaped orifices for receiving a plurality of steel balls of which two are shown, namely balls 108 and 110.

Preferably twenty-four 3/16" balls are used, located at 15 degree intervals around the perimeter of ball retaining ring 96. The diameter at the base of a typical orifice is such as to permit a typical ball to project about 0.068 inch beyond the inner wall 112 of ring 96. Referring to FIG. 2A, ball locking ring, 98 may slide to the left against stop 102 to lock the balls in place in their innermost position with respect to ring 96. Keeper 100 then holds locking ring 98 in place. The balls may be released by removing keeper 100 and sliding locking ring 98 to the right (FIG. 6). The balls are then free to retract outwardly against lip 114 of locking ring 98. Lip 114, of course, keeps the balls from falling out of the corresponding orifices when the coupler is disassembled.

Referring back to FIG. 2A, male part 62, closed at one end, is assembled to the leading end of trailing cable section 18 in exactly the same way as was forward bulkhead 66. Accordingly, a detailed discussion is unnecessary. The stress members are anchored to the closed end of part 62 and the wire bundle is sealed through an oil block as before, by the epoxy compound. A plurality of semispherical detents such as 116, 118 (FIGS. 2A and 7) are milled around the outer perimeter of the right hand open end 120 of male part 62. The number of detents is equal to the number of balls (i.e. 24) in ball retaining ring 96. The outer diameter of right hand end 120 is such as to fit within the inner diameter 112 of ball retaining ring 96 with a clearance of about 0.005 inch.

In operation, when the male and female parts are to be assembled, keeper 100 is removed and ball locking ring 98 (FIGS. 2A and 6) is slid to the right, releasing the balls such as 108 and 100. The right hand end 120 of male part 62 is then inserted into ball retaining ring 96. A tapered portion 122 (FIG. 7) of right hand end 120 provides means for outwardly nudging the released balls so that the two parts can be mated. When shoulder 124 abuts the end of ball retaining ring 96, the balls such as 108 and 110 are able to drop into corresponding detents 116 and 118 after a slight relative rotation of the two parts to align the balls with the detents. Thereafter, ball locking ring 98 may be moved to the left and locked in place by keeper 100. When the two parts are mated, O-ring 106 seals the interior of housing 64 from fluid invasion. As discussed above, keeper 100 is a split ring of any suitable spring-like material so that it can readily be removed or replaced as required. Because each ball falls into a corresponding detent, once parts 60 and 62 have been mated and the balls locked by locking ring 98, the two parts are immobile with respect to each other both in rotation and in tension. Yet they are readily released by removing the keeper and disengaging the balls.

A point that has thus far not been discussed is the manner of interconnecting the wire bundles between the two cable sections. Existing connectors having as many as 450 individual contacts (usually of the pin-and-socket type) are large, complex and very expensive. They are far too large to fit within the coupler section whose diameter must remain the same as that of a cable section or about 2.5 to 3.0 inches. Accordingly a flat connector plate assembly 126 is provided as shown in FIGS. 2A, 2B, 8 and 8A.

The connector plate assembly 126 consists of two connector plates. One connector plate consists of a single metal plate 124 (FIG. 8A) such as aluminum into which a number of rectangular openings such as 150 have been milled for receiving a plurality of miniature connector plugs 125, 125" such as the Cinch DMM 50P which is a fifty-pin male plug made by TRW Inc. of Elk Grove Village, Ill. The mounting flange portion of a plug such as 128 is bolted securely to plate 124 by bolts such as 127. For 450 wires, nine such plugs are required. The other connector plate consists of a pair of aluminum plates 130 and 132 having a plurality of rectangular openings milled therein to match the openings of plate 124. A shallow depression is milled around the perimeter of each rectangular opening on one face of each plate. Thus plate 130 is a mirror image of plate 132. A Cinch DMM 50S plug, 50-socket female plugs, such as 134, 134", are mounted between plates 130 and 132 so that the mounting flange portion 129 of the plug is sandwiched between the two plates, floating in the space 137 provided by the opposite depressions in the plates as shown in an end-view section in FIG. 8. The floating feature is essential in order to allow the 450 pins and sockets of the nine plugs to self-align when connector plate 124 is mated to the other connector plate formed from plates 130, 132. The two connector plates, when mated are held together by Allen screws 135-140. Screw driver slots 142, 144 are provided to pry the two connector plates apart when disassembly is required. The wires from the two wire bundles are doubled-back and have sufficient slack so that when female part 60 is uncoupled from male part 62, the connector plates will be fully exposed for service work.

As previously discussed, the internal diameter of the quick coupler is sufficient to contain the doubled-back wire bundles as well as the connector plates. There also is sufficient volume to contain optional cable-control electronics for controlling cable depth or for electrically configuring various desired types of hydrophone arrays.

I claim as my invention:

1. In a seismic streamer cable including at least two adjacent cable sections, each section consisting of an outer jacket, at least one stress member inside said jacket, a plurality of hydrophones disposed inside said jacket at desired intervals along the length of said cable section, and a plurality of electrical conductors for transmitting signals from said hydrophones, comprising in combination:

a coupler section assembly for mechanically and electrically connecting together said adjacent cable sections, said coupler section including a cylindrical hollow two-part housing including a male part and a mating female part having inner and outer walls, sealable against fluid invasion when mated, for receiving the pluralities of electrical conductors from each said cable section;

a pair of axially disposed mating connector-plate assemblies in said housing, one said connector plate assembly including a plurality of individual miniature multicontact male plugs rigidly mounted thereon for receiving the conductors from one cable section, the other connector plate assembly including a pair of plates and a plurality of individual miniature multicontact female plugs floatingly mounted there-between for receiving the plurality of conductors from the other cable section; and means for releasably locking the parts of said two-part housing together after the connector-plate assemblies have been mated together.

2. The combination as defined in claim 1 further comprising:

a plurality of detents around the circumference of the male part;

a like plurality of balls disposed in ball-retaining orifices around the circumference of the female part, the orifices being of sufficient diameter to allow a portion of the balls to protrude beyond the inner wall of the female part so that the balls are engagable with the detents of the male part;

an axially-slidable locking ring, having a locking position and an open position, mounted on the outer wall of the female part for locking the balls in place so that the two parts are inhibited from relative rotation and from longitudinal separation when under tension; and a split-ring keeper for securing said locking ring in the locking position after the two parts of the housing have been mated together.

* * * * *